United States Patent
Zhang et al.

(10) Patent No.: US 11,564,233 B2
(45) Date of Patent: Jan. 24, 2023

(54) DETERMINATION OF DEFAULT COMMON BEAM

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 17/164,419

(22) Filed: Feb. 1, 2021

(65) Prior Publication Data

US 2022/0248406 A1 Aug. 4, 2022

(51) Int. Cl.
| | | |
|---|---|---|
| H04W 72/04 | (2009.01) | |
| H04W 76/27 | (2018.01) | |
| H04L 5/00 | (2006.01) | |
| H04B 7/04 | (2017.01) | |

(52) U.S. Cl.
CPC .......... *H04W 72/0493* (2013.01); *H04B 7/04* (2013.01); *H04L 5/0091* (2013.01); *H04W 72/042* (2013.01); *H04W 72/046* (2013.01); *H04W 72/0453* (2013.01); *H04W 76/27* (2018.02); *H04L 5/0023* (2013.01)

(58) Field of Classification Search
CPC ........... H04W 72/0493; H04W 72/042; H04W 72/0453; H04W 72/046; H04W 76/27; H04L 5/0023; H04L 5/0091; H04B 7/04
See application file for complete search history.

(56) References Cited

U.S. PATENT DOCUMENTS

| | | | | |
|---|---|---|---|---|
| 2021/0084669 | A1* | 3/2021 | Mondal | H04L 5/0044 |
| 2021/0337547 | A1* | 10/2021 | Rahman | H04W 72/1289 |
| 2021/0360602 | A1* | 11/2021 | Zhou | H04L 5/0044 |
| 2022/0150944 | A1* | 5/2022 | Venugopal | H04L 5/0048 |

FOREIGN PATENT DOCUMENTS

| | | | | |
|---|---|---|---|---|
| WO | WO-2019137509 | A1 * | 7/2019 | H04L 1/00 |
| WO | WO-2022051927 | A1 * | 3/2022 | |
| WO | WO-2022070344 | A1 * | 4/2022 | |

OTHER PUBLICATIONS

English Translation of WO-2019137509-A1, 2019, Retrieved from PE2E Search on May 25, 2022. (Year: 2019).*

(Continued)

*Primary Examiner* — Omar J Ghowrwal
(74) *Attorney, Agent, or Firm* — Patterson + Sheridan, L.L.P.

(57) ABSTRACT

Certain aspects of the present disclosure provide techniques for identifying default beams. A method that may be performed by a user equipment (UE) includes receiving signalling activating common beam transmission configuration indication (TCI) states, where each of the common beam TCI states indicates a plurality of beams including a plurality of downlink beams, a plurality of uplink beams, or at least one downlink beam and at least one uplink beam. The method also includes identifying one or more default beams among the common beam TCI states and communicating via the one or more default beams.

30 Claims, 11 Drawing Sheets

(56) References Cited

OTHER PUBLICATIONS

English Translation of WO-2022070344-A1, 2022, Retrieved from PE2E Search on May 26, 2022. (Year: 2022).*
ETSI TS 138 214 V16.2.0, 5G; NR; Physical layer procedures for data, Jul. 2020, 3GPP TS 38.214 version 16.2.0 Release 16 [retrieved on Sep. 23, 2022]. Retrieved from the Internet <URL: https://www.etsi.org/deliver/etsi_ts/138200_138299/138214/16.02.00_60/ts_138214v160200p.pdf> (Year: 2020).*

* cited by examiner

| TCI Codepoint | TCI State ID | RS Resource |
|---|---|---|
| 0 | 0 | DL RS_0 |
| | | DL RS_1 |
| | 1 | UL RS_0 |
| | | UL RS_1 |
| 1 | 2 | DL RS_0 |
| | | UL RS_1 |
| 2 | 3 | DL RS_2 |
| | 4 | UL RS_2 |

FIG. 6

DETERMINATION OF DEFAULT COMMON BEAM

BACKGROUND

Field of the Disclosure

Aspects of the present disclosure relate to wireless communications, and more particularly, to techniques for identifying default beams for wireless communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable wireless performance such as desirable latency and/or data rates due to the wireless access provided by default beams during certain events, such as before beams are activated or updated.

Certain aspects of the subject matter described in this disclosure can be implemented in a method for wireless communication by a user equipment (UE). The method generally includes receiving signalling activating common beam transmission configuration indication (TCI) states, where each of the common beam TCI states indicates a plurality of beams including a plurality of downlink beams, a plurality of uplink beams, or at least one downlink beam and at least one uplink beam. The method also includes identifying one or more default beams among the common beam TCI states and communicating via the one or more default beams.

Certain aspects of the subject matter described in this disclosure can be implemented in a method for wireless communication by a network entity. The method generally includes transmitting, to an UE, signalling activating common beam TCI states, where each of the common beam TCI states indicates a plurality of beams including a plurality of downlink beams, a plurality of uplink beams, or at least one downlink beam and at least one uplink beam. The method also includes identifying one or more default beams among the common beam TCI states, and communicating with the UE via the one or more default beams.

Certain aspects of the subject matter described in this disclosure can be implemented in an apparatus for wireless communication. The apparatus generally includes a transceiver, a memory, and a processor. The transceiver is configured to receive signalling activating common beam TCI states, where each of the common beam TCI states indicates a plurality of beams including a plurality of downlink beams, a plurality of uplink beams, or at least one downlink beam and at least one uplink beam. The processor is coupled to the memory, and the processor and the memory are configured to identify one or more default beams among the common beam TCI states. The transceiver is further configured to communicate via the one or more default beams.

Certain aspects of the subject matter described in this disclosure can be implemented in an apparatus for wireless communication. The apparatus generally includes a transceiver, a memory, and a processor. The transceiver is configured to transmit, to a UE, signalling activating common beam TCI states, where each of the common beam TCI states indicates a plurality of beams including a plurality of downlink beams, a plurality of uplink beams, or at least one downlink beam and at least one uplink beam. The processor is coupled to the memory, and the processor and the memory are configured to identify one or more default beams among the common beam TCI states. The transceiver is further configured to communicate with the UE via the one or more default beams.

Certain aspects of the subject matter described in this disclosure can be implemented in an apparatus for wireless communication. The apparatus generally includes means for receiving signalling activating common beam TCI states, where each of the common beam TCI states indicates a plurality of beams including a plurality of downlink beams, a plurality of uplink beams, or at least one downlink beam and at least one uplink beam; means for identifying one or more default beams among the common beam TCI states; and means for communicating via the one or more default beams.

Certain aspects of the subject matter described in this disclosure can be implemented in an apparatus for wireless communication. The apparatus generally includes transmitting, to a UE, signalling activating common beam TCI states, where each of the common beam TCI states indicates a plurality of beams including a plurality of downlink beams, a plurality of uplink beams, or at least one downlink beam and at least one uplink beam; identifying one or more default beams among the common beam TCI states; and communicating with the UE via the one or more default beams.

Certain aspects of the subject matter described in this disclosure can be implemented in a computer readable medium having instructions stored thereon for receiving signalling activating common beam TCI states, where each of the common beam TCI states indicates a plurality of beams including a plurality of downlink beams, a plurality of uplink beams, or at least one downlink beam and at least one uplink beam; identifying one or more default beams among the common beam TCI states; and communicating via the one or more default beams.

Certain aspects of the subject matter described in this disclosure can be implemented in a computer readable medium having instructions stored thereon for transmitting, to a UE, signalling activating common beam TCI states, where each of the common beam TCI states indicates a plurality of beams including a plurality of downlink beams, a plurality of uplink beams, or at least one downlink beam and at least one uplink beam; identifying one or more default beams among the common beam TCI states; and communicating with the UE via the one or more default beams.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 6 is a table illustrating an example mapping among transmission configuration indication (TCI) codepoints, TCI states, and reference signals, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
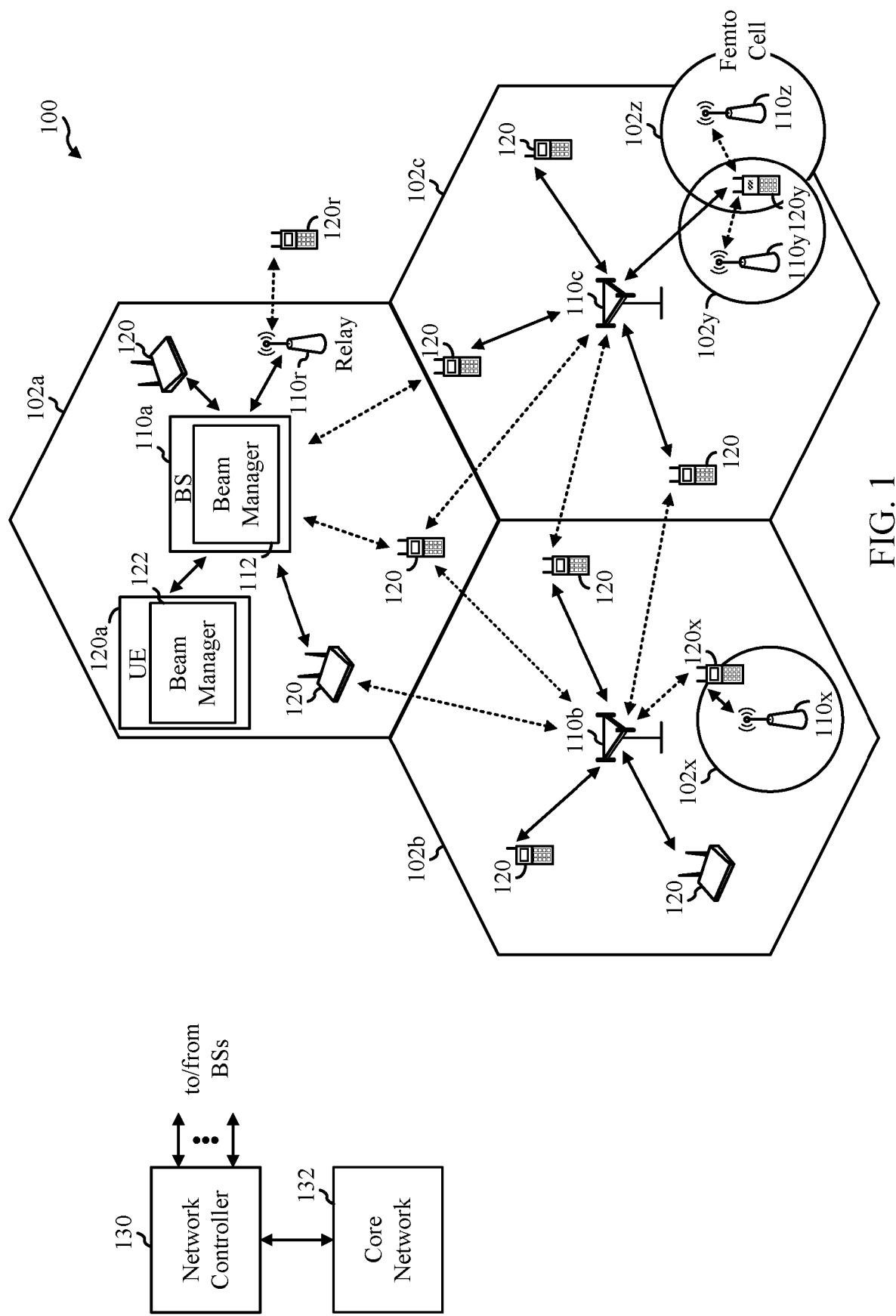
FIG. 1 is a block diagram conceptually illustrating an example wireless communication network, in accordance with certain aspects of the present disclosure.

Aspects of the present disclosure provide apparatus, methods, processing systems, and computer readable mediums for determining a default beam among common beam transmission configuration indication (TCI) states. In aspects, the default beam may be implicitly or explicitly indicated to the UE. The default beam determination described herein may enable the UE to communicate with a base station and/or another UE in various scenarios before common beam TCI states are activated. In certain aspects, the default beam determination described herein may enable desirable wireless communication performance, such as desirable latency and/or data rates due to the wireless access that default beams provide before beams are activated.

The following description provides examples of default beam identification in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

As shown in FIG. 1, the BS 110a includes a beam manager 112 that identifies default beams among common beam TCI states for communicating with a UE during certain types of events, in accordance with aspects of the present disclosure. The UE 120a includes a beam manager 122 that identifies default beams among common beam TCI states for communicating with an BS and/or another UE during certain types of events, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
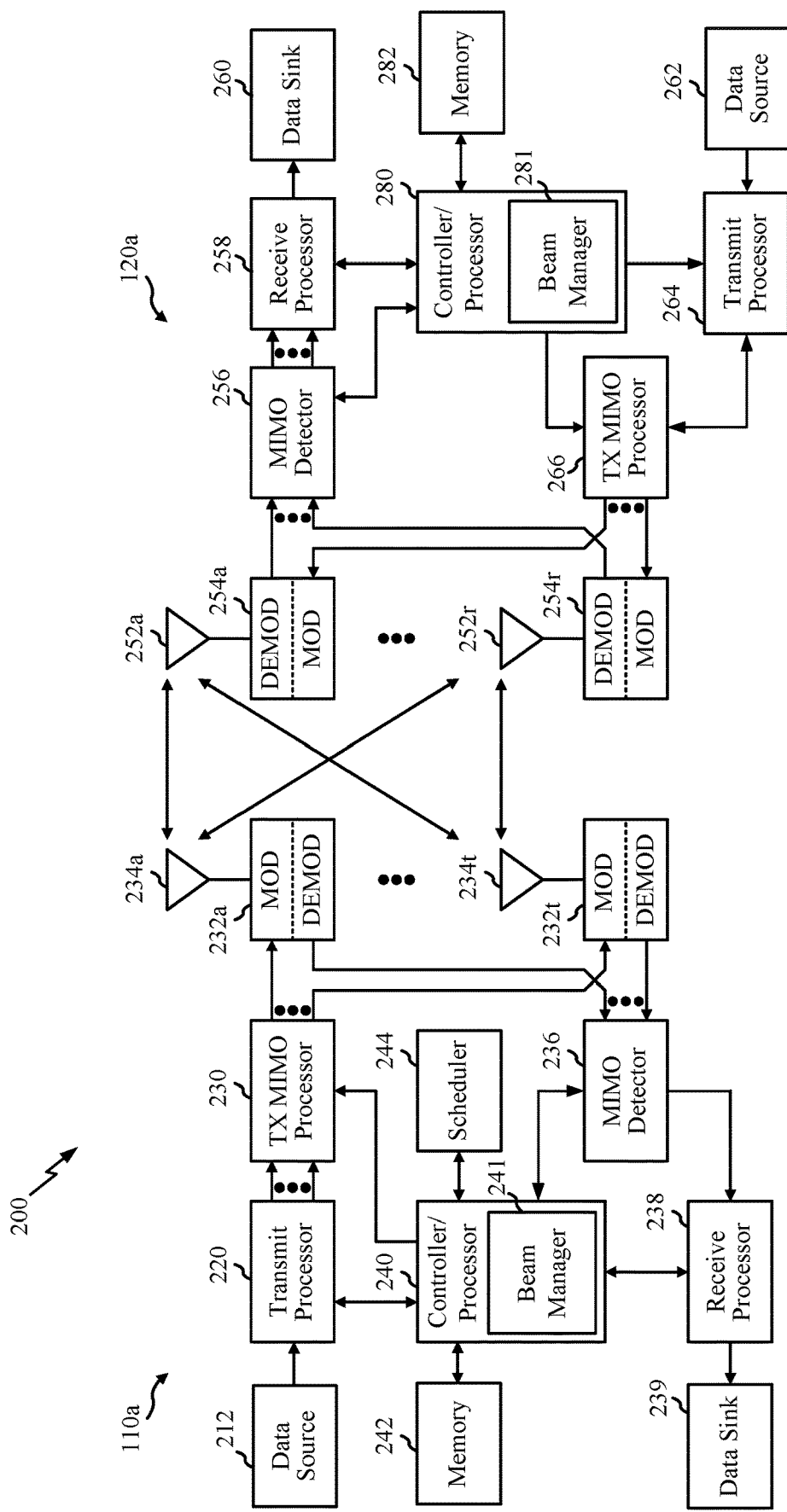
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a beam manager 241 that identifies default beams among common beam TCI states for communicating with a UE during certain types of events, according to aspects described herein. As shown in FIG. 2, the controller/processor 280 of the UE 120a has a beam manager 281 that identifies default beams among common beam TCI states for communicating with a BS or another UE during certain types of events, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
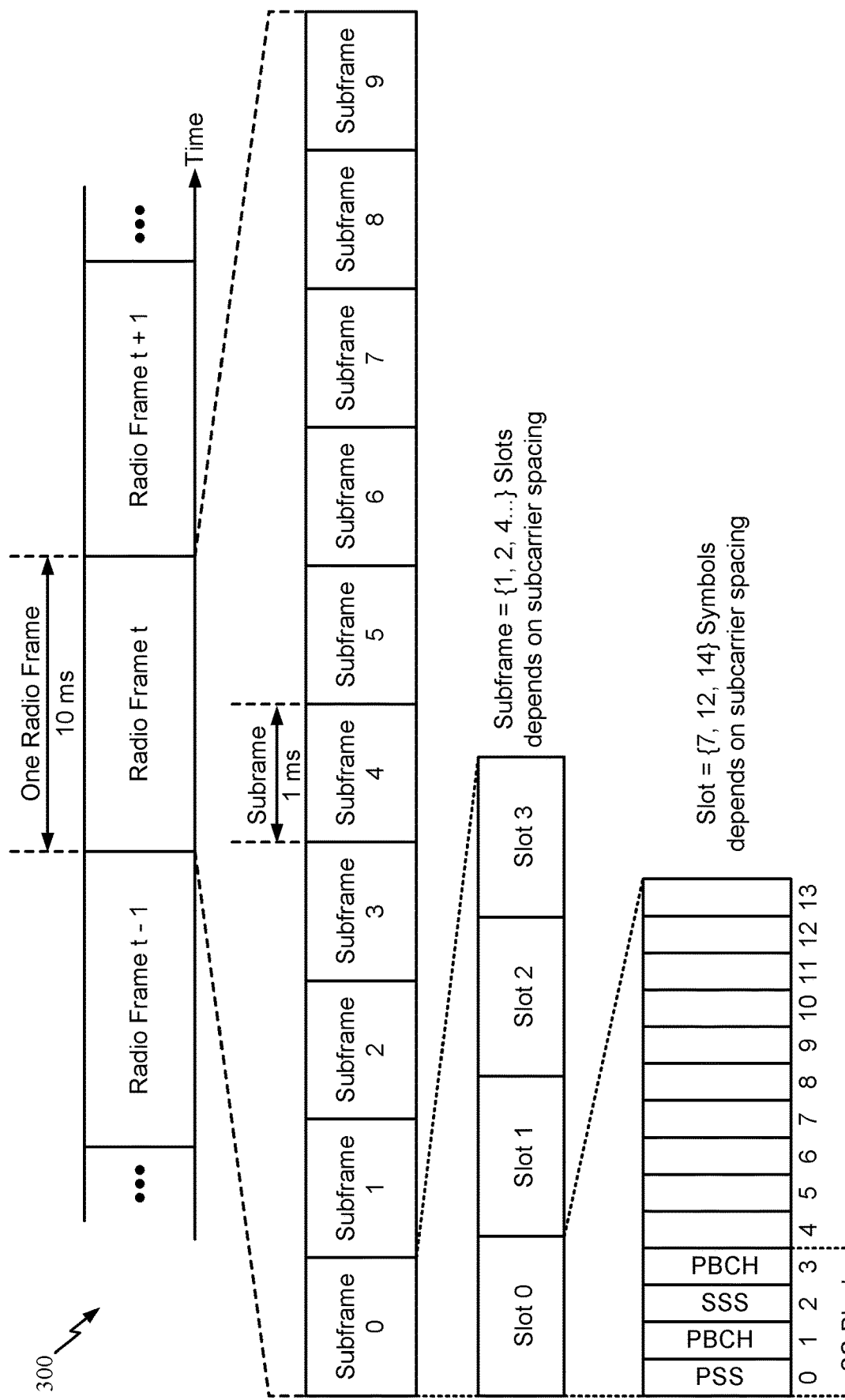
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, ... slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst periodicity, system frame number, etc. The SSBs may be organized into an SS burst to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times within an SS burst, for example, with up to sixty-four different beam directions for mmWave. The multiple transmissions of the SSB are referred to as an SS burst in a half radio frame. SSBs in an SS burst may be transmitted in the same frequency region, while SSBs in different SS bursts can be transmitted at different frequency regions.

Example Beamforming

Figure 4:
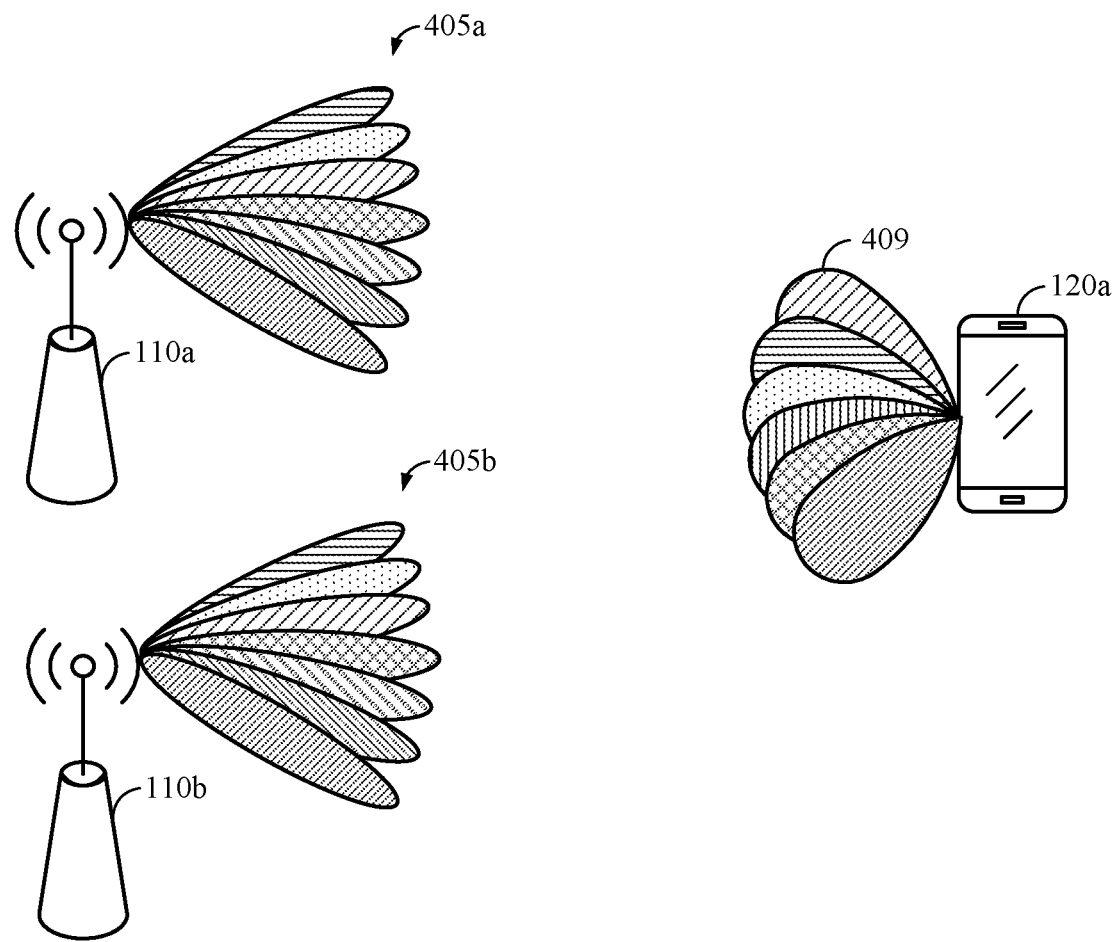
FIG. 4 is a diagram illustrating example beamformed communications between BSs and a UE, in accordance with certain aspects of the present disclosure.

FIG. 4 illustrates example beamformed transmission by transmitters (e.g., a first BS 110a and a second BS 110b of FIG. 1) and beamformed reception by a UE (e.g., UE 120a of FIG. 1). As shown, each of the first BS 110a and the second BS 110b may transmit signals via one or more transmit beams 405a and 405b, respectively. The UE 120a may receive the signals via one or more receive beams 409. While this example is described with respect to the base stations transmitting via transmit beams and the UE receiving via receive beams to facilitate understanding, aspects of the present disclosure may also be applied to the base stations receiving via reception beams and the UE transmitting via transmit beams. A UE may communicate with another UE via one or more beams, for example, as depicted in FIG. 4. In certain cases, the base stations and/or UEs may also communicate via an omnidirectional beam.

QCL Port and TCI States

In many cases, it is important for a UE to know which assumptions the UE can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, a transmission configuration indication (TCI) state is used to convey information about a quasi co-location (QCL) assumption associated with one or more reference signals. In general, a TCI state may include at least one source reference signal to provide a reference (UE assumption) for determining QCL and/or a spatial filter (a receive spatial filter and/or a transmit spatial filter).

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." That is, separate reference signals may be considered quasi co-located if a receiver (e.g., a UE) can apply channel properties detected from a first reference signal to a second reference signal. A TCI state generally includes a QCL-relationship, for example, between one or more reference signals and another reference signal, such as specific PDSCH demodulation reference signal (DMRS) ports.

In some cases, a UE may be configured with up to M TCI-States. Configuration of the M TCI-States can come about via higher layer signalling, while a UE may be signalled to decode PDSCH according to a detected PDCCH with downlink control information (DCI) indicating one of the TCI states. Each configured TCI state may include one RS set TCI-RS-SetConfig that indicates different QCL assumptions between certain source and target signals.

Figure 5:
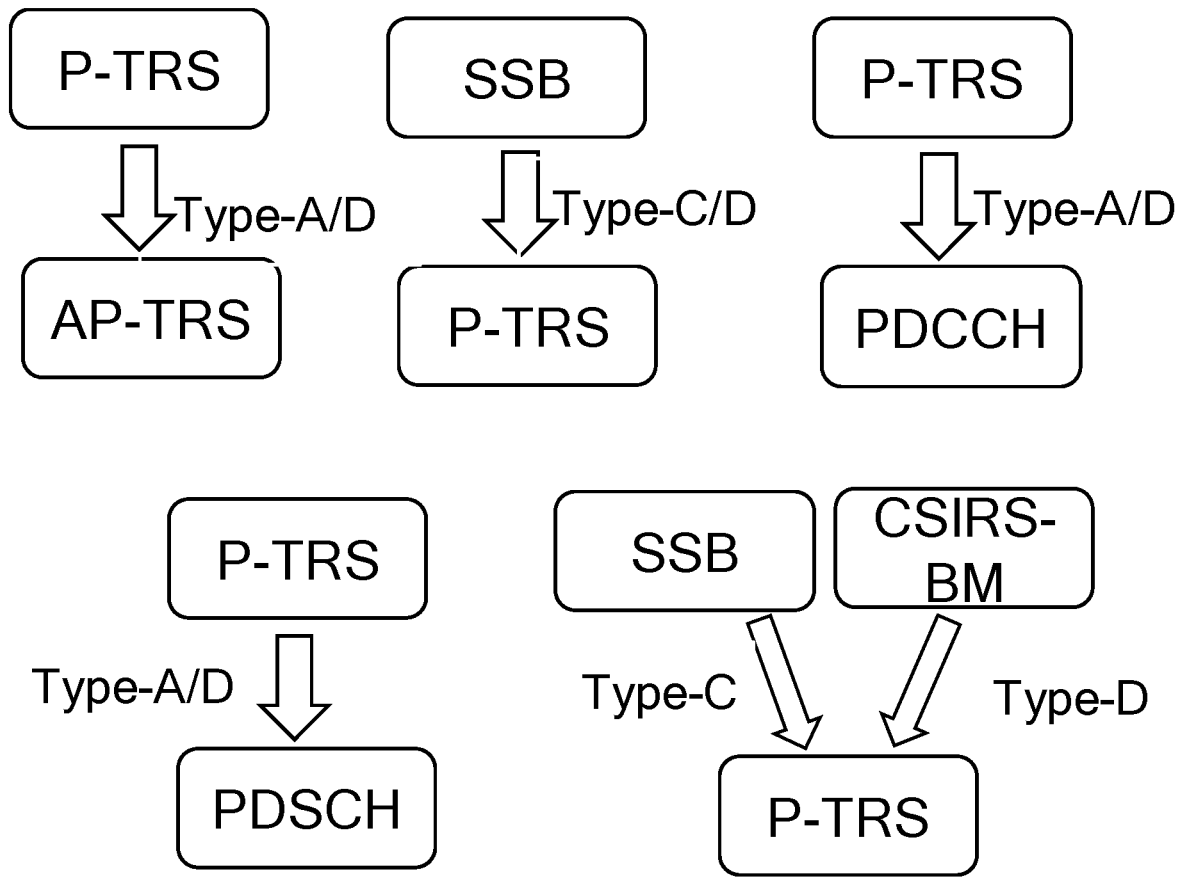
FIG. 5 is a diagram illustrating example associations of downlink reference signals with corresponding quasi co-location (QCL) types, in accordance with certain aspects of the present disclosure.

FIG. 5 illustrate examples of the association of DL reference signals with corresponding QCL types that may be indicated by a TCI-RS-SetConfig. In the examples of FIG. 5, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be a DMRS of a PDSCH. In certain cases, the target RS can be any other RS, such as PUSCH DMRS, CSI-RS, tracking reference signal (TRS) (which may also referred to as a phase tracking reference signals (PTRS)), a positioning reference signal (PRS), and/or SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 5, for the case of two DL RSs, the QCL types can take on a variety of arrangements. For example, QCL types may not be the same, regardless of whether the references are to the same DL RS or different DL RSs. In the illustrated example, synchronization signal block (SSB) is associated with Type C QCL for P-TRS, while CSI-RS for beam management (CSI-RS-BM) is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:
QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}.

In aspects, a QCL assumption may include a frequency dispersion assumption, a time dispersion assumption, and/or a spatial assumption. The frequency dispersion assumption may include Doppler shift and/or Doppler spread, and the time dispersion assumption may include average delay and/or delay spread. The spatial assumption (e.g., spatial Rx parameters for QCL-TypeD) may include various spatial parameters for receive and/or transmit beamforming such as angle of arrival (AoA), AoA spread, dominant AoA, average AoA, Power Angular Spectrum (PAS) of AoA, angle of departure (AoD), AoD spread, average AoD, PAS of AoD, transmit/receive channel correlation, transmit/receive beamforming, spatial channel correlation, etc. The spatial QCL assumptions may enable a UE to determine a spatial filter (analog, digital, or hybrid) for beamforming a receive beam (e.g., during beam management procedures) and/or a transmit beam. For example, an SSB resource indicator may indicate that the AoA spread for a previous reference signal (e.g., the SSB) may be used for a subsequent transmission (e.g., a PDSCH transmission).

In certain cases, a TCI state may be associated with two or more downlink beams, two or more uplink beams, or at least one downlink beam and at least one uplink beam. For example, FIG. 6 illustrates example mappings among TCI codepoints, TCI state identifiers (IDs), and reference signals, in accordance with certain aspects of the present disclosure. As shown, a TCI state ID may be mapped to two downlink reference signals, two uplink reference signals, or a downlink reference signal and an uplink reference signal. Certain TCI states may be mapped a TCI codepoint. For example, the TCI codepoint of 0 may be associated with TCI state IDs 0 and 1, where the TCI state ID of 0 is associated with downlink reference signals: DL RS_0 and DL RS_1, and the TCI state ID of 1 is associated with the uplink reference signals: UL RS_0 and UL RS_1. In this example, a reference signal may be associated with a specific downlink or uplink beam, for example, as described herein with respect to FIG. 4. A joint DL/UL, DL only, or UL only TCI state may apply to X DL signals and Y UL signals, where (1) X>=1 and Y>=1—joint DL/UL signals; (2) X>=2 and Y=0—DL only signals; or (3) X=0 and Y>=2—UL only signals. As used herein, a TCI state associated with two or more downlink beams, two or more uplink beams, or at least one downlink beam and at least one uplink beam may be referred to as a common beam TCI state in that there is a TCI state common to multiple beams (e.g., reference signals associated with separate beams). In certain cases, a common beam TCI state may also refer to a TCI codepoint being associated with multiple TCI states, where each of the TCI states may be associated with at least one downlink beam or at least one uplink beam. Downlink signals may include one or more PDCCH, PDSCH, CSI-RS, SSB, PTRS, or PRS. Uplink signals may include one or more of PUCCH, PUSCH, physical random access channel (PRACH), or SRS.

In certain cases, a wireless network (e.g., a 5G NR wireless network) may support a joint or separate downlink or uplink beam indication. For example, the wireless network may support a Layer 1 (i.e., physical layer)-based beam indication using at least a UE-specific (i.e., unicast) DCI to indicate joint or separate DL/UL beam indication from the active TCI states. DCI formats 1_1 and 1_2 and/or other DCI formats (e.g., 0_0, 0_1, 0_2, or 1_0) in NR may be used for joint beam indication. A separate DCI format dedicated for beam indications may also be supported. The UE may acknowledge successful decoding of beam indication. An acknowledgement (ACK) message or a negative-ACK (NACK) message of the PDSCH scheduled by the DCI carrying the beam indication can be used as an ACK for the DCI. The wireless network may also support activation of one or more TCI states via medium access control (MAC) signalling, such as a MAC-control element (MAC-CE).

In certain cases, the UE may have multiple candidate common beam TCI states and/or activated TCI states. It may be ambiguous to the UE which of these TCI states can be used as a default TCI state in certain situations. For a first period, when a UE receives an initial higher layer/RRC configuration of candidate TCI states and before reception of the activation command (for one or more channels/RSs associated with the common TCI/beam are not explicitly indicated/configured with beam indication or not having the TCI field present), a beam associated with one of the common beam TCI states may be the default beam to be used during this first period. For a second period, when a UE receives the activation command of more than one TCI states, and when scheduling/CSI-RS triggering offset is less than a beam switch latency threshold (e.g. beamSwitchingTiming), a PDSCH or aperiodic (AP) CSI-RS beam may be the default beam for this second period. For a third period, when a base station (gNB) is activating or updating a beam for a UE, the time duration that the beam update command of a channel/RS has been received, transmitted, or acknowledged (ACKed) but has not been applied, i.e. before the action time arrives (e.g. X ms or X time-domain resource unit(s) after the time of reception or acknowledgment), a beam associated with one of the common beam TCI states may be used as a default beam for this third period. Accordingly, what is needed are techniques and apparatus for determining a default beam among the common beam TCI states.

Example Determination of a Default Common Beam

Aspects of the present disclosure provide various methods and apparatus for determining a default beam among common beam TCI states. In aspects, the default beam may be implicitly or explicitly indicated to the UE. The default beam determination described herein may enable the UE to communicate with a base station and/or another UE in various scenarios before common beam TCI states are activated. In certain aspects, the default beam determination described herein may enable desirable wireless communication performance, such as desirable latency and/or data rates due to the wireless access that default beams provide.

Figure 7:
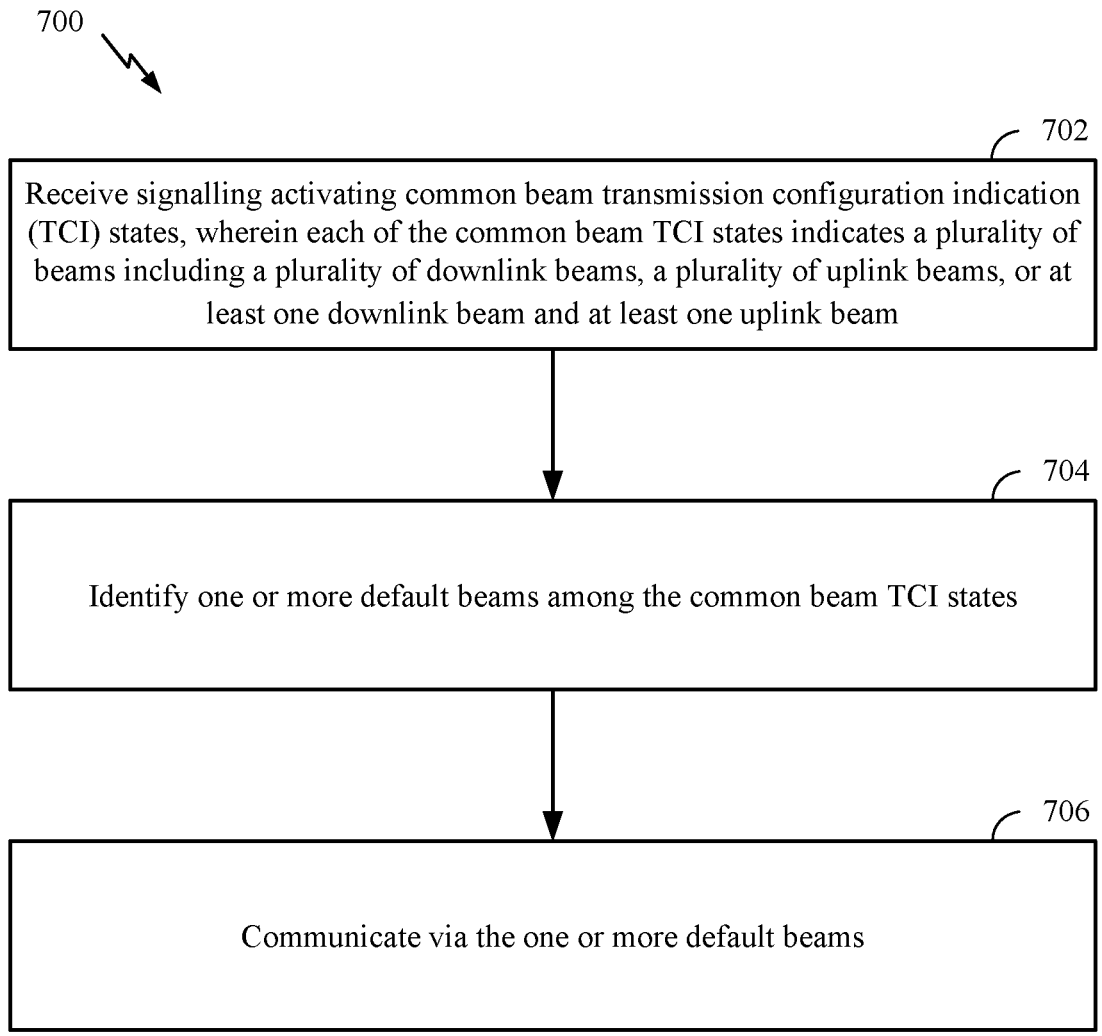
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (such as the UE 120a in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 702, where the UE may receive signalling activating common beam TCI states, where each of the common beam TCI states indicates a plurality of beams including a plurality of downlink beams, a plurality of uplink beams, or at least one downlink beam and at least one uplink beam. For example, the UE may receive an indication activating the common beam TCI states as depicted in FIG. 6.

At block 704, the UE may identify one or more default beams among the common beam TCI states. In aspects, a default beam may be identified for a specific application, such as the first period, and another default beam may be identified for a separate application, such as the second or third period. The UE may use separate means for identifying the default beams for particular applications. The UE may use the same means for identifying the default beams for particular applications. That is, any option for identifying the default beam described herein may apply to any of the use cases (e.g., the first, second, or third periods) or a specific use case (e.g., only the first period). Different applications may follow different or the same options for identifying the default beam.

At block 708, the UE may communicate via the one or more default beams. For example, the UE may communicate with a base station (e.g., the BS 110a) and/or another UE via downlink and/or uplink default beam(s). In certain cases, the UE may communicate via the default beams for certain events and/or prior to activating or updating the common beam TCI states as further described herein.

In certain aspects, the default beam may be indicated by a particular common beam TCI state ID among all of the activated common beam TCI states (i.e., the common beam TCI states indicated as being activated at block 702) or all of the candidate common beam TCI states (i.e., the pool of candidates that can be activated or deactivated). For example, the UE may identify the beams associated with the common beam TCI states having the lowest or height TCI state ID as being the default beams. At block 704, the UE may identify the one or more default beams among the common beam TCI states based on an identifier (e.g., a TCI state ID) associated with at least one of the common beam TCI states. The UE may identify the one or more default beams correlating to at least one of the common beam TCI states with a highest or a lowest TCI state ID. That is, as a common beam TCI state indicates a QCL relationship for multiple beams. The UE may identify the beams associated with the common beam TCI states having the highest or lowest TCI state ID. For example, the UE may select the beams associated with the lowest TCI state ID (e.g., TCI state ID=0) in FIG. 6 as being the default DL beams. As used herein, a default beam that correlates to a TCI state or any other aspect (such as a reference signal resource identifier, a TCI codepoint, a control resource set (CORESET), PDSCH, etc.) may refer to a relationship or association between the default beam and a particular TCI state or other aspect.

For certain aspects, the default beam may be indicated by a particular common beam TCI codepoint index among all of the activated common beam TCI states or all of the candidate common beam TCI states. As an example, the UE may identify the beams associated with the first or last (lowest or highest) TCI codepoint as being the default beams. At block 704, the UE may identify the one or more default beams among the common beam TCI states based on one or more codepoints associated with the common beam TCI states. In certain cases, the UE may identify the one or more default beams correlating to at least one of the common beam TCI states with a highest or a lowest codepoint among the one or more codepoints. The correlation of the default beams to the TCI states based on the codepoint index may involve the UE identifying the TCI codepoint with the lowest or highest index value among the activated or candidate TCI states. The UE may select the beams associated with the TCI states mapped to the codepoint. For example, the UE may select the beams associated with the lowest codepoint index (e.g., TCI Codepoint=0) in FIG. 6 as being the default beams.

In certain cases, the determination of the default beams based on the TCI codepoint may also be applied in a multi-TRP context. The default beam may be indicated by a particular TCI codepoint index, which maps to two TCI states (one for a first TRP and the other one for another TRP) among all activated common beam TCI states or candidate common beam TCI states. For example, suppose the UE selects the beams associated with the lowest codepoint index (TCI Codepoint=0) in FIG. 6, the UE may communicate with a first TRP via the beams associated with the TCI state ID of 0 and communicate with a second TRP via the beams associated with the TCI state ID of 1. At block 704, the UE may identify the one or more default beams correlating to a codepoint that is associated with two or more of the common beam TCI states, where each of the two or more of the common beam TCI states is associated with a separate TRP. At block 706, the UE may communicate with separate TRPs via the default beams selected based on the codepoint that maps to two or more common beam TCI states.

In aspects, the UE may determine the default beams on a component carrier (CC) basis. The UE may determine the default beams within an active bandwidth part (BWP) of a CC based on various characteristics associated with the beams in the active BWP. For example, the default beam(s) may be indicated by the QCL-TypeD reference signal in the activated common beam TCI applied to a CORESET with the lowest or highest CORESET ID in the current active BWP of a particular CC. In certain cases, the default beam may correlate to the reference signal with 'QCL-Type-D' corresponding to the QCL assumption of the CORESET with the lowest or highest ID. That is, the default beam may correspond to a reference signal with a QCL-TypeD assumption or other spatial QCL assumptions, where the reference signal is also associated with the lowest or highest CORESET ID in the current active BWP of a particular CC. Expressed another way, the UE may identify the CORESET with the lowest or highest identify in the current active BWP of a particular CC, and from that particular CORESET, the UE may identify the default beam(s) as the reference signals having a spatial QCL assumption (e.g., a QCL-TypeD assumption) as indicated by the corresponding TCI state associated with the CORESET.

With respect to the operations 700, the UE may identify the one or more default beams among the common beam TCI states based on a CORESET identifier associated with a reference signal in the common beam TCI states. In certain cases, the UE may identify the one or more default beams correlating to the reference signal associated with a CORESET with a highest or a lowest CORESET identifier among a plurality of CORESETs in an active BWP of a CC. The UE may identify the reference signal in the common beam TCI states as having an QCL assumption based on one or more spatial parameters (e.g., spatial reception parameters and/or spatial transmission parameters).

In certain cases, the determination of the default beams based on CORESET ID may also be applied in a multi-TRP context. In certain cases, default beams may be identified based on the CORESET ID for each pool of CORESET IDs, where each CORESET pool may be indicated by a CORESETPoolIndex. That is, a default beam may be identified for each value of CORESETPoolIndex among the CORESETs in each of the corresponding pools. With respect to the operations 700, the UE may identify a default beam for each pool of CORESETs based on CORESET identifiers in each pool of CORESETs (such as the CORESET(s) with the lowest or highest CORESET identifier).

In certain aspects, the determination of the default beams based on CORESET ID in the active BWP may be further depend on selecting CORESETs monitored by the UE in the latest slot in the active BWP of a serving cell. At block 704, the UE may identify the CORESET with the highest or the lowest CORESET identifier among the plurality of CORE- SETs in a latest time-domain resource unit (e.g., a radio frame, half-frame, slot, or mini-slot) in which the CORESETs within the active BWP of a cell are monitored by the UE. In certain cases, the determination of the default beams based on CORESET ID in the latest slot (or other time-domain resource unit) may also be applied in a multi-TRP context as described herein. For example, default beam(s) may be associated with each value of CORESETPoolIndex.

In certain cases, the UE may not be configured with any CORESETs in the active BWP, for example, due to cross-carrier scheduling. In such cases, the default beam may be identified based on various characteristics associated with beams mapping to a PDSCH in the active BWP. For example, the default beam may be the QCL-typeD reference signal in the activated common beam TCI state for a PDSCH with the lowest or highest TCI state ID among all activated common beam TCI states in the active DL BWP. At block 704, the UE may identify the one or more default beams among the common beam TCI states based on a TCI state identifier associated a PDSCH in an active BWP of a CC, if the UE is not configured with a CORESET in the active BWP of the CC. The UE may identify the one or more default beams correlating to at least one of the common beam TCI states with a highest or a lowest TCI state ID associated with the PDSCH. For example, the TCI states may indicate reference signals associated with a DMRS for a particular PDSCH in the active BWP, and the UE may select the default beams from the TCI states with the highest or lowest TCI state ID among those TCI states associated with the PDSCH.

The various schemes for determining the default beams may be applied in a multi-TRP context. For example, if a UE is configured by higher layer parameter PDCCH-Config that includes two different values of CORESETPoolIndex in ControlResourceSet, the UE may identify the default beams for each of the CORESET pools, which may be associated with separate TRPs.

In cases where the default beams are identified from a common beam TCI state that only includes downlink beams, the UE may derive default uplink beams from the indications associated with default downlink beams, such as the CORESET ID and/or PDSCH in an active BWP, or vice versa. For example, after identifying a TCI state that only includes downlink beams based on the CORESET ID and/or PDSCH in an active BWP, the UE may identify an uplink beam (e.g., an SRS beam) that is quasi-colocated with the downlink beam (e.g., an SSB beam). Suppose the UE identifies a particular SSB or CSI-RS based on the CORESET ID or PDSCH in an active BWP, the UE may select an SRS beam with a spatial filter that matches the SSB or CSI-RS, such as an AoD for the SRS that matches the AoA for the SSB.

In aspects, the UE may identify the default beam(s) via an explicit indication or an implicit indication from a network entity (e.g., the BS 110). For example, the UE may receive the explicit indication via at least one of downlink control signaling (e.g., DCI), MAC signaling, or radio resource control (RRC) signaling (e.g., a RRC configuration). In certain cases, the explicit indication may indicate a default beam per channel or reference signal. The explicit indication may indicate default beams for multiple channels or reference signals. The explicit indication may indicate the one or more default beams correlating to at least one of one or more channels (e.g., PDSCH, PDCCH, PUSCH, PUCCH, or PRACH) or one or more reference signals.

In aspects, the default beams may be used to communicate with a base station or another UE prior to a specific event. For example, the UE may communicate via the default beams prior to switching to or updating at least one of the common beam TCI states, for example, in response to the UE receiving a command activating the common beam TCI states or an updated configuration for the common beam TCI states.

Expressed another way, the default beams may be used to communicate with a base station or another UE during a specific type of event. At block 704, the UE may identify identifying the one or more default beams for one or more types of events (such as the first period, second period, or third period described herein), and at block 706, the UE may communicate via the one or more default beams during the one or more types of events. The one or more types of events may include at least one of a first period including when the UE receives a configuration of candidate TCI states and before the UE receives an activation command for the candidate TCI states, a second period including when the UE receives the activation command and when a scheduling offset or a channel state information triggering offset is less than a beam switch latency threshold, or a third period including when the UE receives the activation command or an update to one or more beams and before the UE applies the activated or updated one or more beams. As previously described, during the second period, a PDSCH or AP CSI-RS beam may be the default beam. Any of the implicit indications may apply to all types of events or any specific type of event for determining the default beam.

Figure 8:
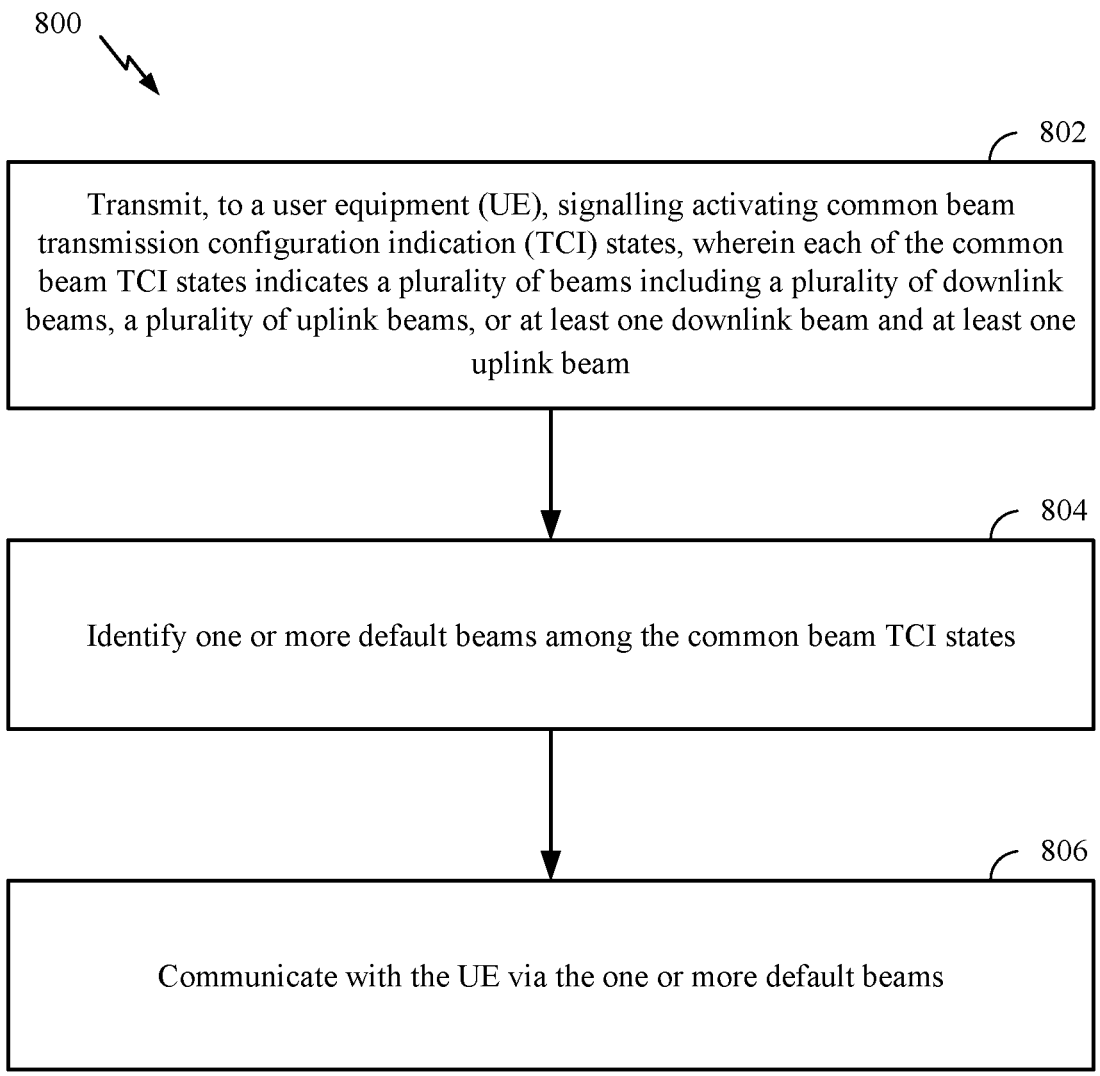
FIG. 8 is a flow diagram illustrating example operations for wireless communication by a network entity, in accordance with certain aspects of the present disclosure.

FIG. 8 is a flow diagram illustrating example operations 800 for wireless communication, in accordance with certain aspects of the present disclosure. The operations 800 may be performed, for example, by a network entity (such as the BS 110*a* in the wireless communication network 100). The operations 800 may be complementary to the operations 700 performed by the UE. The operations 800 may be implemented as software components that are executed and run on one or more processors (e.g., controller/processor 240 of FIG. 2). Further, the transmission and reception of signals by the network entity in operations 800 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, a network entity may refer to a wireless communication device and/or a computing device that is operable to wirelessly communicate with a UE, such as a base station and/or network controller.

The operations 800 may begin, at block 802, where the network entity may transmit, to an UE (e.g., the UE 120*a*), signalling activating common beam TCI states, where each of the common beam TCI states indicates a plurality of beams including a plurality of downlink beams, a plurality of uplink beams, or at least one downlink beam and at least one uplink beam. For example, the network entity may activate the TCI states via MAC control signalling (such as a TCI States Activation/Deactivation for UE-specific PDSCH MAC CE) as indicated by one or more TCI codepoints.

At block 804, the network entity may identify one or more default beams among the common beam TCI states. In aspects, the network entity may identify the default beams via an explicit indication and/or an implicit indication as described herein with respect to the operations 700. For example, the network entity may identify the default beams for each CORESET pool based on the beams being associated with the lowest CORESET ID in such pools. In certain cases, the network entity may transmit, to the UE, the explicit indication via at least one of downlink control signaling, MAC signaling, or RRC signaling.

At block 806, the network entity may communicate with the UE via the one or more default beams. In certain aspects, the network entity may communicate with the UE via a single TRP or multiple TRPs (e.g., remote radio heads). As an example, the network entity may communicate with the UE via a first TRP as a macro cell and second TRP as a pico cell. In the multi-TRP context, the network entity may use default beams from each CORESET pool or PDSCHs in the active BWPs.

Figure 9:
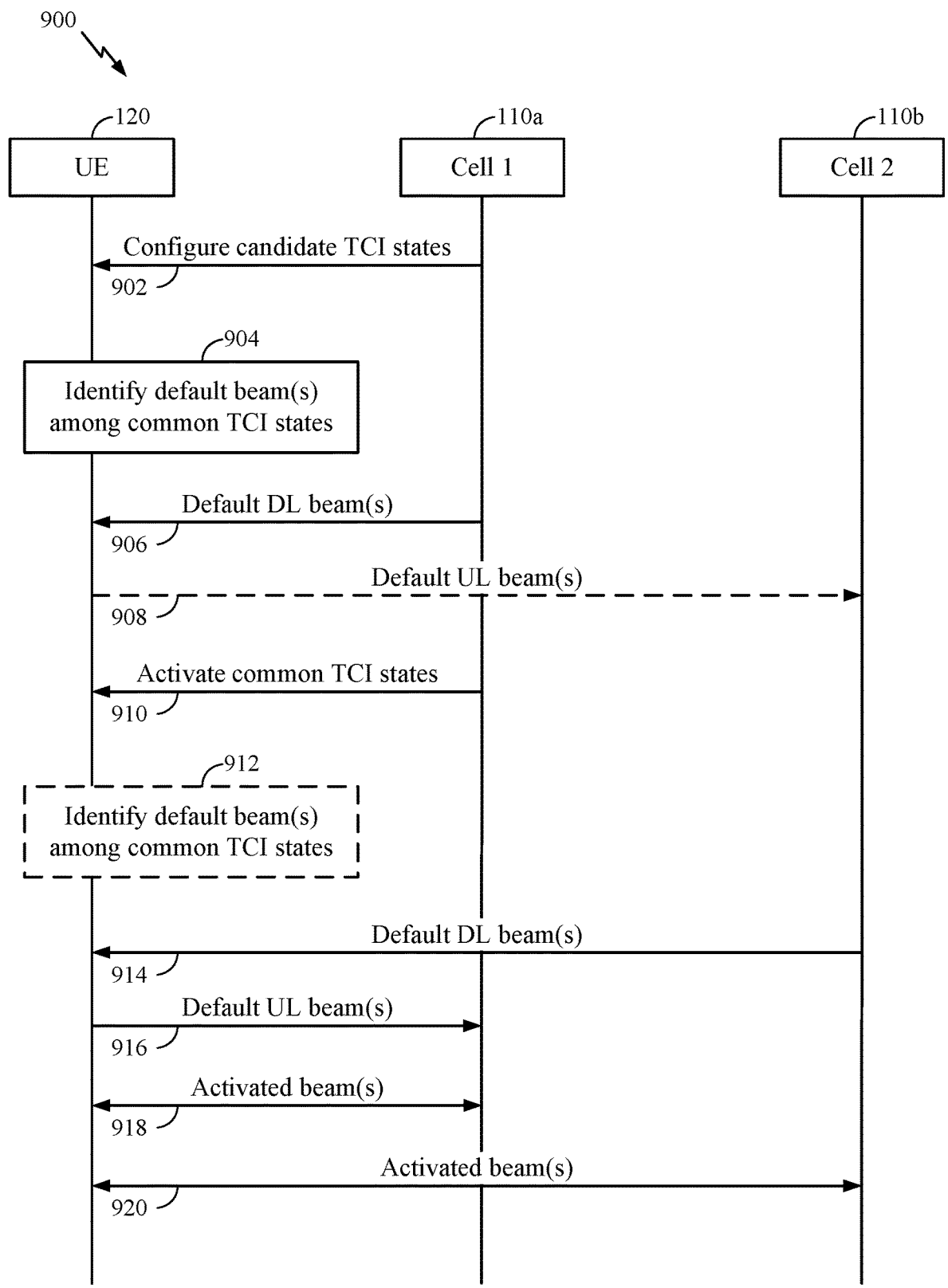
FIG. 9 is a signaling flow diagram illustrating example signaling for identifying default beams, in accordance with aspects of the present disclosure.

FIG. 9 is a signaling flow illustrating example signaling for default beam identification, according to certain aspects of the present disclosure. At 902, a first cell 110a may configure the UE 120 with candidate common beam TCI states. For example, the first cell 110a may configure the UE 120 with common beam TCI states as candidate TCI states depicted in FIG. 6. At 904, the UE 120 may identify the default beam(s) among the common beam TCI states, for example, based on TCI state IDs and/or CORESET IDs as described herein. At 906, the UE 120 may receive downlink transmissions via the default downlink beams from the first cell 110a according to the default beams identified at 904. At 908, the UE 120 may transmit uplink transmissions via the default uplink beams to the second cell 110b according to the default beams identified at 904. At 906 and 908, the UE may communicate with the first and second cells 110a, 110b using default beams identified from the candidate TCI states prior to receiving an activation command.

At 910, the first cell 110a may activate common beam TCI states from the candidate TCI states. For example, the first cell 110a may activate TCI states with IDs 0, 1, 3, and 4 as depicted in FIG. 6 via MAC signaling. Before switching to the activated TCI states, at 912, the UE identify default beams among the common beam TCI states that have been activated at 910. In certain cases, the UE may use a separate option for identifying the default beams after receiving the activation command at 910. For example, the UE may identify the default beams based on the TCI states having the lowest or highest TCI codepoint. At 914, the UE may receive downlink transmissions via default downlink beams from the second cell 110b according to the default beams identified at 912. At 916, the UE may transmit uplink transmissions via default uplink beams to the first cell 110b according to the default beams identified at 912. After a certain duration from the activation command received at 910, the UE 120 may switch to the activated beams and communicate with the first cell 110a and/or the second cell 110b via the activated beams at 918, 920.

Figure 10:
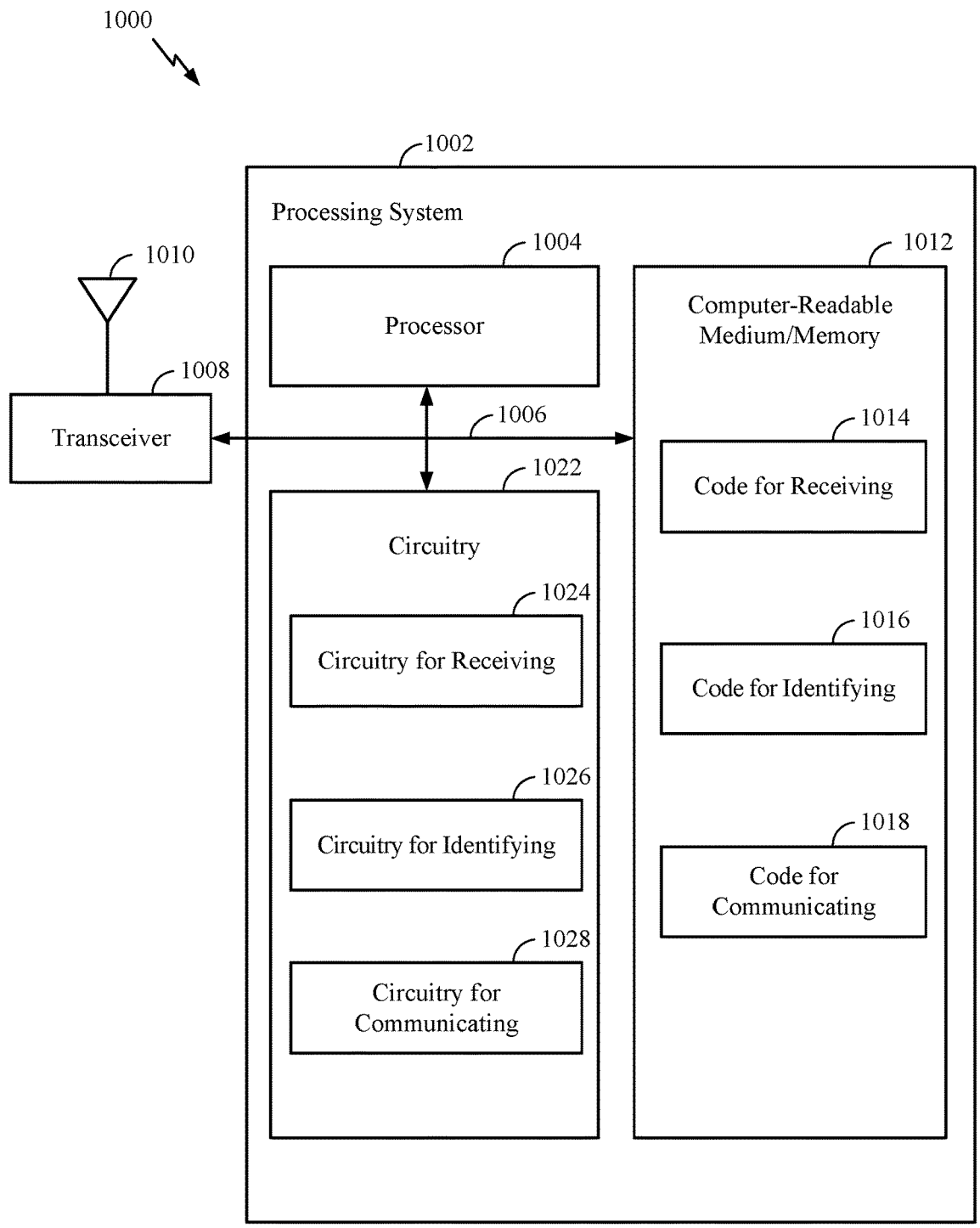
FIG. 10 illustrates a communications device (e.g., a UE) that may include various components configured to perform operations for the techniques disclosed herein in accordance with aspects of the present disclosure.

FIG. 10 illustrates a communications device 1000 (e.g., a UE) that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/ memory 1012 is configured to store instructions (e.g., computer-executable code) that when executed by the processor 1004, cause the processor 1004 to perform the operations illustrated in FIG. 7, or other operations for performing the various techniques discussed herein for determining default beam(s) among common beam TCI states. In certain aspects, computer-readable medium/memory 1012 stores code for receiving 1014, code for identifying 1016, and/or code for communicating 1018. In certain aspects, the processing system 1002 has circuitry 1022 configured to implement the code stored in the computer-readable medium/memory 1012. In certain aspects, the circuitry 1022 is coupled to the processor 1004 and/or the computer-readable medium/ memory 1012 via the bus 1006. For example, the circuitry 1022 includes circuitry for receiving 1024, circuitry for identifying 1026, and/or circuitry for communicating 1028.

Figure 11:
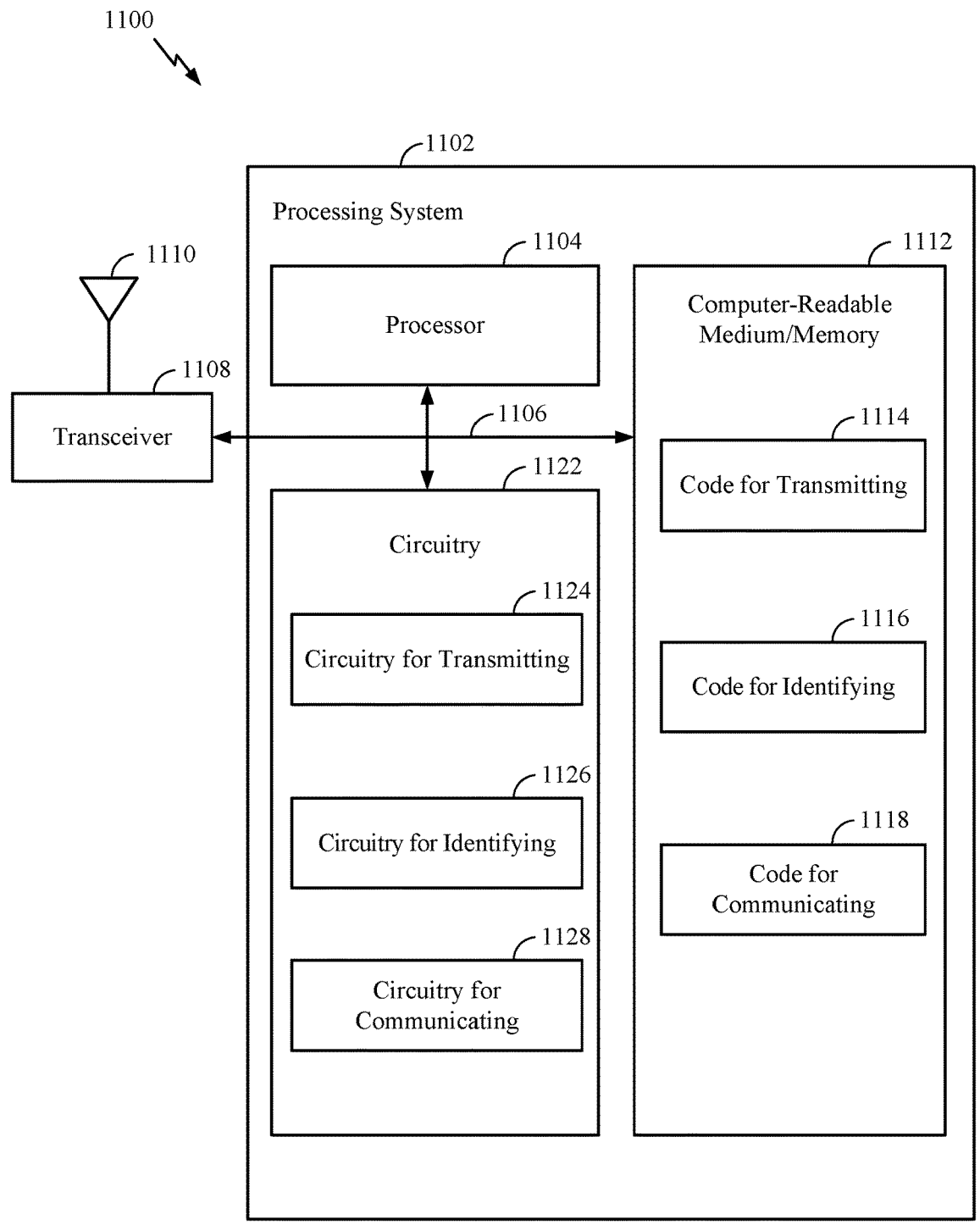
FIG. 11 illustrates a communications device (e.g., a BS) that may include various components configured to perform operations for the techniques disclosed herein in accordance with aspects of the present disclosure.

FIG. 11 illustrates a communications device 1100 (e.g., a BS) that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/ memory 1112 is configured to store instructions (e.g., computer-executable code) that when executed by the processor 1104, cause the processor 1104 to perform the operations illustrated in FIG. 8, or other operations for performing the various techniques discussed herein for determining default beam(s) among common beam TCI state. In certain aspects, computer-readable medium/memory 1112 stores code for transmitting 1114, code for identifying 1116, and/or code for communicating 1118. In certain aspects, the processing system 1102 has circuitry 1122 configured to implement the code stored in the computer-readable medium/memory 1112. In certain aspects, the circuitry 1122 is coupled to the processor 1104 and/or the computer-readable medium/ memory 1112 via the bus 1106. For example, the circuitry 1122 includes circuitry for transmitting 1124, circuitry for identifying 1126, and/or circuitry for communicating 1128.

Example Aspects

In addition to the various aspects described above, specific combinations of aspects are within the scope of the disclosure, some of which are detailed below:

Aspect 1. A method of wireless communication by a UE, comprising: receiving signalling activating common beam TCI states, wherein each of the common beam TCI states indicates a plurality of beams including a plurality of downlink beams, a plurality of uplink beams, or at least one downlink beam and at least one uplink beam; identifying one or more default beams among the common beam TCI states; and communicating via the one or more default beams.

Aspect 2. The method of Aspect 1, wherein identifying the one or more default beams comprises identifying the one or more default beams among the common beam TCI states based on an identifier associated with at least one of the common beam TCI states.

Aspect 3. The method of Aspect 2, wherein identifying the one or more default beams comprises identifying the one or more default beams correlating to at least one of the common beam TCI states with a highest or a lowest TCI state identifier.

Aspect 4. The method according to any of Aspects 1-3, wherein identifying the one or more default beams comprises identifying the one or more default beams among the common beam TCI states based on one or more codepoints associated with the common beam TCI states.

Aspect 5. The method of Aspect 4, wherein identifying the one or more default beams comprises identifying the one or more default beams correlating to at least one of the common beam TCI states with a highest or a lowest codepoint among the one or more codepoints.

Aspect 6. The method of Aspect 5, wherein identifying the one or more default beams comprises identifying the one or more default beams correlating to a codepoint that is associated with two or more of the common beam TCI states, wherein each of the two or more of the common beam TCI states is associated with a separate transmission-reception point.

Aspect 7. The method according to any of Aspects 1-6, wherein identifying the one or more default beams comprises identifying the one or more default beams among the common beam TCI states based on a CORESET identifier associated with a reference signal in the common beam TCI states.

Aspect 8. The method of Aspect 7, wherein identifying the one or more default beams comprises identifying the one or more default beams correlating to the reference signal associated with a CORESET with a highest or a lowest CORESET identifier among a plurality of CORESETs in an active BWP of a CC.

Aspect 9. The method of Aspect 8, wherein identifying the one or more default beams comprises identifying the CORESET with the highest or the lowest CORESET identifier among the plurality of CORESETs in a latest time-domain resource unit in which the CORESETs within the active BWP of a cell are monitored by the UE.

Aspect 10. The method according to any of Aspects 1-9, wherein identifying the one or more default beams comprises identifying the one or more default beams among the common beam TCI states based on a TCI state identifier associated a PDSCH in an active BWP of a component carrier, if the UE is not configured with a CORESET in the active BWP of the component carrier.

Aspect 11. The method of Aspect 10, wherein identifying the one or more default beams comprises identifying the one or more default beams correlating to at least one of the common beam TCI states with a highest or a lowest TCI state identifier associated with the PDSCH.

Aspect 12. The method according to any of Aspects 1-11, further comprising receiving an explicit indication for the one or more default beams via at least one of downlink control signalling, medium access control signalling, or radio resource control signalling.

Aspect 13. The method according to any of Aspects 1-12, wherein communicating comprises communicating via the one or more default beams prior to switching to or updating at least one of the common beam TCI states.

Aspect 14. The method according to any of Aspects 1-13, wherein: identifying the one or more default beams comprises identifying the one or more default beams for one or more types of events; and communicating comprises communicating via the one or more default beams during the one or more types of events.

Aspect 15. A method of wireless communication by a network entity, comprising: transmitting, to a UE, signalling activating common beam TCI states, wherein each of the common beam TCI states indicates a plurality of beams including a plurality of downlink beams, a plurality of uplink beams, or at least one downlink beam and at least one uplink beam; identifying one or more default beams among the common beam TCI states; and communicating with the UE via the one or more default beams.

Aspect 16. The method of Aspect 15, wherein identifying the one or more default beams comprises identifying the one or more default beams among the common beam TCI states based on an identifier associated with at least one of the common beam TCI states.

Aspect 17. The method of Aspect 16, wherein identifying the one or more default beams comprises identifying the one or more default beams correlating to at least one of the common beam TCI states with a highest or a lowest TCI state identifier.

Aspect 18. The method according to any of Aspects 15-17, wherein identifying the one or more default beams comprises identifying the one or more default beams among the common beam TCI states based on one or more codepoints associated with the common beam TCI states.

Aspect 19. The method of Aspect 18, wherein identifying the one or more default beams comprises identifying the one or more default beams correlating to at least one of the common beam TCI states with a highest or a lowest codepoint among the one or more codepoints.

Aspect 20. The method according to any of Aspects 15-19, wherein identifying the one or more default beams comprises identifying the one or more default beams among the common beam TCI states based on a CORESET identifier associated with a reference signal in the common beam TCI states.

Aspect 21. The method of Aspect 20, wherein identifying the one or more default beams comprises identifying the one or more default beams correlating to the reference signal associated with a CORESET with a highest or a lowest CORESET identifier among a plurality of CORESETs in an active BWP of a CC.

Aspect 22. The method of Aspect 21, wherein identifying the one or more default beams comprises identifying the CORESET with the highest or the lowest CORESET identifier among the plurality of CORESETs in a latest time-domain resource unit in which the CORESETs within the active BWP of the network entity.

Aspect 23. The method according to any of Aspects 15-22, wherein identifying the one or more default beams comprises identifying the one or more default beams among the common beam TCI states based on a TCI state identifier associated a PDSCH in an active BWP of a component carrier, if the the network entity has not configured the UE with a CORESET in the active BWP of the component carrier.

Aspect 24. The method of Aspect 23, wherein identifying the one or more default beams comprises identifying the one or more default beams correlating to at least one of the common beam TCI states with a highest or a lowest TCI state identifier associated with the PDSCH.

Aspect 25. The method according to any of Aspects 15-24, further comprising transmitting, to the UE, an explicit indication for the one or more default beams via at least one of downlink control signaling, medium access control signaling, or radio resource control signaling.

Aspect 26. The method of Aspect 25, wherein the explicit indication indicates the one or more default beams correlating to at least one of one or more channels or one or more reference signals.

Aspect 27. The method according to any of Aspects 15-26, wherein communicating comprises communicating via the one or more default beams prior to switching to or updating at least one of the common beam TCI states.

Aspect 28. The method according to any of Aspects 15-27, wherein: identifying the one or more default beams comprises identifying the one or more default beams for one or more types of events; and communicating comprises communicating via the one or more default beams during the one or more types of events.

Aspect 29. An apparatus comprising means for performing the method of any of Aspects 1 through 14.

Aspect 30. An apparatus comprising means for performing the method of any of Aspects 15 through 28.

Aspect 31. An apparatus comprising a transceiver, at least one processor, and a memory coupled to the at least one processor, the memory comprising code executable by the at least one processor to cause the apparatus to perform the method of any of Aspects 1 through 14.

Aspect 32. An apparatus comprising a transceiver, at least one processor, and a memory coupled to the at least one processor, the memory comprising code executable by the at least one processor to cause the apparatus to perform the method of any of Aspects 1 through 14.

Aspect 33. A computer readable medium storing computer executable code thereon for wireless communications that, when executed by at least one processor, cause an apparatus to perform the method of any of Aspects 1 through 14.

Aspect 34. A computer readable medium storing computer executable code thereon for wireless communications that, when executed by at least one processor, cause an apparatus to perform the method of any of Aspects 15 through 28.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method of wireless communication by a user equipment (UE), comprising:
receiving an initial configuration of candidate common beam transmission configuration indication (TCI) states;
communicating using a common beam associated with one of the candidate common beam TCI states before the candidate common beam TCI states are activated;
receiving signalling activating common beam TCI states from the candidate common beam TCI states, wherein each of the activated common beam TCI states indicates a plurality of beams including a plurality of downlink beams, a plurality of uplink beams, or at least one downlink beam and at least one uplink beam;
identifying one or more default beams among the activated common beam TCI states; and
communicating via the one or more default beams.

2. The method of claim 1, wherein identifying the one or more default beams comprises identifying the one or more default beams among the activated common beam TCI states based on an identifier associated with at least one of the activated common beam TCI states.

3. The method of claim 2, wherein identifying the one or more default beams comprises identifying the one or more default beams correlating to at least one of the activated common beam TCI states with a highest or a lowest TCI state identifier.

4. The method of claim 1, wherein identifying the one or more default beams comprises identifying the one or more default beams among the activated common beam TCI states based on one or more codepoints associated with the activated common beam TCI states.

5. The method of claim 4, wherein identifying the one or more default beams comprises identifying the one or more default beams correlating to at least one of the activated common beam TCI states with a highest or a lowest codepoint among the one or more codepoints.

6. The method of claim 5, wherein identifying the one or more default beams comprises identifying the one or more default beams correlating to a codepoint that is associated with two or more of the activated common beam TCI states, wherein each of the two or more of the activated common beam TCI states is associated with a separate transmission-reception point.

7. The method of claim 1, wherein identifying the one or more default beams comprises identifying the one or more default beams among the activated common beam TCI states based on a control resource set (CORESET) identifier associated with a reference signal in the activated common beam TCI states.

8. The method of claim 7, wherein identifying the one or more default beams comprises identifying the one or more default beams correlating to the reference signal associated with a CORESET with a highest or a lowest CORESET identifier among a plurality of CORESETs in an active bandwidth part (BWP) of a component carrier (CC).

9. The method of claim 8, wherein identifying the one or more default beams comprises identifying the CORESET with the highest or the lowest CORESET identifier among the plurality of CORESETs in a latest time-domain resource unit in which the CORESETs within the active bandwidth part (BWP) of a cell are monitored by the UE.

10. The method of claim 1, wherein identifying the one or more default beams comprises identifying the one or more default beams among the activated common beam TCI states based on a TCI state identifier associated a physical downlink shared channel (PDSCH) in an active BWP of a component carrier, if the UE is not configured with a CORESET in the active BWP of the component carrier.

11. The method of claim 10, wherein identifying the one or more default beams comprises identifying the one or more default beams correlating to at least one of the activated common beam TCI states with a highest or a lowest TCI state identifier associated with the PDSCH.

12. The method of claim 1, further comprising receiving an explicit indication for the one or more default beams via at least one of downlink control signaling, medium access control signaling, or radio resource control signaling.

13. The method of claim 1, wherein communicating comprises communicating via the one or more default beams prior to switching to or updating at least one of the activated common beam TCI states.

14. The method of claim 1, wherein:
identifying the one or more default beams comprises identifying the one or more default beams for one or more types of events; and
communicating comprises communicating via the one or more default beams during the one or more types of events.

15. A method of wireless communication by a network entity, comprising:
transmitting, to a user equipment (UE) an initial configuration of candidate common beam transmission configuration indication (TCI) states;
communicate with the UE using a common beam associated with one of the candidate common beam TCI states before the candidate common beam TCI states are activated;
transmitting, to the user equipment (UE), signalling activating the candidate common beam TCI states, wherein each of the activated common beam TCI states indicates a plurality of beams including a plurality of downlink beams, a plurality of uplink beams, or at least one downlink beam and at least one uplink beam;
identifying one or more default beams among the activated common beam TCI states; and
communicating with the UE via the one or more default beams.

16. The method of claim 15, wherein identifying the one or more default beams comprises identifying the one or more default beams among the activated common beam TCI states based on an identifier associated with at least one of the activated common beam TCI states.

17. The method of claim 15, wherein identifying the one or more default beams comprises identifying the one or more default beams correlating to at least one of the activated common beam TCI states with a highest or a lowest TCI state identifier.

18. The method of claim 15, wherein identifying the one or more default beams comprises identifying the one or more default beams among the activated common beam TCI states based on one or more codepoints associated with the activated common beam TCI states.

19. The method of claim 18, wherein identifying the one or more default beams comprises identifying the one or more default beams correlating to at least one of the activated common beam TCI states with a highest or a lowest codepoint among the one or more codepoints.

20. The method of claim 15, wherein identifying the one or more default beams comprises identifying the one or more default beams among the activated common beam TCI states based on a control resource set (CORESET) identifier associated with a reference signal in the activated common beam TCI states.

21. The method of claim 20, wherein identifying the one or more default beams comprises identifying the one or more default beams correlating to the reference signal associated with a CORESET with a highest or a lowest CORESET identifier among a plurality of CORESETs in an active bandwidth part (BWP) of a component carrier (CC).

22. The method of claim 21, wherein identifying the one or more default beams comprises identifying the CORESET with the highest or the lowest CORESET identifier among the plurality of CORESETs in a latest time-domain resource unit in which the CORESETs within the active bandwidth part (BWP) of the network entity.

23. The method of claim 21, further comprising transmitting, to the UE, an explicit indication for the one or more default beams via at least one of downlink control signaling, medium access control signaling, or radio resource control signaling.

24. The method of claim 23, wherein the explicit indication indicates the one or more default beams correlating to at least one of one or more channels or one or more reference signals.

25. The method of claim 15, wherein identifying the one or more default beams comprises identifying the one or more default beams among the activated common beam TCI states based on a TCI state identifier associated a physical downlink shared channel (PDSCH) in an active BWP of a component carrier, if the network entity has not configured the UE with a CORESET in the active BWP of the component carrier.

26. The method of claim 25, wherein identifying the one or more default beams comprises identifying the one or more default beams correlating to at least one of the activated common beam TCI states with a highest or a lowest TCI state identifier associated with the PDSCH.

27. The method of claim 15, wherein communicating comprises communicating via the one or more default beams prior to switching to or updating at least one of the activated common beam TCI states.

28. The method of claim 15, wherein:
identifying the one or more default beams comprises identifying the one or more default beams for one or more types of events; and
communicating comprises communicating via the one or more default beams during the one or more types of events.

29. An apparatus for wireless communication, comprising:
a transceiver configured to:
receive a configuration of candidate common beam transmission configuration (TCI) states:
communicate using a common beam associated with one of the candidate common beam TCI states before the candidate common beam TCI states are activated;
receive signalling activating the candidate common beam TCI states, wherein each of the activated common beam TCI states indicates a plurality of beams including a plurality of downlink beams, a plurality of uplink beams, or at least one downlink beam and at least one uplink beam;
a memory; and
a processor coupled to the memory, the processor and the memory being configured to identify one or more default beams among the activated common beam TCI states_; and
wherein the transceiver is further configured to communicate via the one or more default beams.

30. An apparatus for wireless communication, comprising:
- a transceiver configured to:
  - transmit, to a user equipment (UE), an initial configuration of candidate common beam transmission configuration indication (TCI) states;
  - communicate using a common beam associated with one of the candidate common beam TCI states before the candidate common beam TCI states are activated;
  - transmit, to the user equipment (UE), signalling activating the TCI states, wherein each of the activated common beam TCI states indicates a plurality of beams including a plurality of downlink beams, a plurality of uplink beams, or at least one downlink beam and at least one uplink beam;
- a memory; and
- a processor coupled to the memory, the processor and the memory being configured to identify one or more default beams among the activated common beam TCI states; and
- wherein the transceiver is further configured to communicate with the UE via the one or more default beams.

* * * * *